UNITED STATES PATENT OFFICE.

PAUL JULIUS, OF LUDWIGSHAFEN-ON-THE-RHINE, AND LOUIS BLANGEY, OF MANNHEIM, GERMANY, ASSIGNORS TO BADISCHE ANILIN & SODA FABRIK, OF LUDWIGSHAFEN-ON-THE-RHINE, GERMANY, A CORPORATION OF GERMANY.

AZO DYE AND PROCESS OF MAKING.

932,289.

Specification of Letters Patent. Patented Aug. 24, 1909.

No Drawing. Application filed April 15, 1909. Serial No. 490,156.

*To all whom it may concern:*

Be it known that we, PAUL JULIUS and LOUIS BLANGEY, doctors of philosophy and chemists, respectively a subject of the Emperor of Austria-Hungary and a citizen of the Swiss Republic, residing, respectively, at Ludwigshafen-on-the-Rhine and Mannheim, Germany, have invented new and useful Improvements in Azo Dyes and Processes of Making the Same, of which the following is a specification.

We have discovered that by combining diazotized 2.6-dinitro-anilin with beta naphthol, a scarlet-red coloring matter can be obtained which is especially suitable for use in the form of its lakes, since these are fast against the action of water, alcohol, lime, and light, and are insoluble in oil and do not sublime. The combination of the diazotized 2.6-dinitro-anilin with the beta-naphthol is preferably caused to take place in the presence of free mineral acid, but it can be carried out in the presence of soda, lime, acetate, or the like. Our new coloring matter possesses a scarlet-red color, is insoluble in water, difficultly soluble in alcohol, more easily soluble in hot xylene, and in the pure state melts at about 248° C.

The following example will serve to illustrate further the nature of our invention and how it can be carried into practical effect, but our invention is not confined to this example. Diazotize eighteen and three-tenths parts by weight of 2.6-dinitro-anilin by introducing it into a solution in concentrated sulfuric acid of the requisite quantity of nitrosyl sulfate, and then allow the solution to run, while stirring, into an aqueous suspension of fifteen parts by weight of beta-naphthol to which ice has been added. The combination takes place immediately. If desired, the combination may be carried out in the presence of soda, lime, acetate, or the like, and, if desired, a substratum, of Turkey red oil, or soap, may be added.

Now what we claim is:—

1. The process of producing azo coloring matter by combining diazotized 2.6-dinitro-anilin with beta-naphthol.

2. As a new article of manufacture the azo coloring matter which can be obtained by combining diazotized 2.6-dinitro-anilin with beta-naphthol which coloring matter possesses a scarlet-red color, is insoluble in water, difficultly soluble in alcohol, more easily soluble in hot xylene, and in the pure state melts at about 248° C.

In testimony whereof we have hereunto set our hands in the presence of two subscribing witnesses.

PAUL JULIUS.
LOUIS BLANGEY.

Witnesses:
J. ALEC. LLOYD,
JOS. H. LEUTE.